(12) United States Patent
Robbins (10) Patent No.: US 8,374,166 B1
(45) Date of Patent: Feb. 12, 2013

(54) METHOD AND SYSTEM FOR PROVIDING CALL WAITING FEATURES IN A SIP-BASED NETWORK

(75) Inventor: David C Robbins, Grafton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 307 days.

(21) Appl. No.: 11/534,426

(22) Filed: Sep. 22, 2006

Related U.S. Application Data

(60) Provisional application No. 60/719,465, filed on Sep. 22, 2005.

(51) Int. Cl.
*H04L 12/66* (2006.01)

(52) U.S. Cl. ............ 370/352; 379/215.01; 379/214.01; 379/88.12; 379/207.11; 379/202.01; 455/420; 455/419

(58) Field of Classification Search .............. 370/352, 370/356; 379/215, 88.21, 142, 197, 202, 379/212, 214, 93.35, 246, 215.01; 455/420, 455/418–419
See application file for complete search history.

(56) References Cited

U.S. PATENT DOCUMENTS

| | | | |
|---|---|---|---|
| 3,737,587 A | 6/1973 | Romero | |
| 4,154,987 A | 5/1979 | Rosenberg et al. | |
| 4,528,424 A | 7/1985 | Middleton et al. | |
| 4,723,271 A | 2/1988 | Grundtisch | |
| 4,741,024 A | 4/1988 | Del Monte et al. | |
| 4,950,011 A | 8/1990 | Borcea et al. | |
| 5,165,095 A | 11/1992 | Borcherding | |
| 5,323,444 A | 6/1994 | Ertz et al. | |
| 5,471,519 A | 11/1995 | Howe et al. | |
| 5,619,561 A | 4/1997 | Reese | |
| 5,815,550 A | 9/1998 | Miller | |
| 5,835,570 A | 11/1998 | Wattenbarger | |
| 5,913,166 A | 6/1999 | Buttitta et al. | |
| 5,970,134 A | 10/1999 | Highland et al. | |
| 5,999,610 A | 12/1999 | Lin et al. | |
| 6,021,176 A | 2/2000 | McKendry et al. | |
| 6,026,156 A * | 2/2000 | Epler et al. ............... | 379/215.01 |
| 6,031,896 A | 2/2000 | Gardell et al. | |
| 6,072,865 A | 6/2000 | Baeza | |
| 6,208,726 B1 | 3/2001 | Bansal et al. | |
| 6,219,414 B1 | 4/2001 | Maciejewski et al. | |
| 6,308,726 B2 | 10/2001 | Bansal et al. | |
| 6,337,898 B1 | 1/2002 | Gordon | |
| 6,339,639 B1 | 1/2002 | Henderson | |
| 6,404,876 B1 | 6/2002 | Smith et al. | |
| 6,484,196 B1 | 11/2002 | Maurille | |
| 6,510,315 B1 | 1/2003 | Arnson | |
| 6,636,594 B1 | 10/2003 | Oran | |
| 6,735,295 B1 | 5/2004 | Brennan et al. | |
| 6,741,695 B1 | 5/2004 | McConnell et al. | |

(Continued)

OTHER PUBLICATIONS www.carrollcommunications.com/ipoffice/5donotdisturb.html, p. 1 of 2 , Sep. 2006.

(Continued)

*Primary Examiner* — Joseph J Nguyen (57) ABSTRACT

A method that includes receiving a first call request from a second user to a first user, establishing a first dialog between a network element and the first user, establishing a second dialog between the network element and the second user, establishing a third dialog between the network element and a third user in response to a second call request from a third user, establishing a fourth dialog between the network element and the first user as a result of establishing the third dialog, waiting for a response from the first user in the fourth dialog and receiving one or more indications of actions from the first user to manage the disposition of the second call request.

14 Claims, 8 Drawing Sheets

U.S. PATENT DOCUMENTS

| | | | |
|---|---|---|---|
| 6,744,877 B1 | 6/2004 | Edwards | |
| 6,754,325 B1 | 6/2004 | Silver et al. | |
| 6,801,604 B2 | 10/2004 | Maes et al. | |
| 6,807,259 B1 | 10/2004 | Patel et al. | |
| 6,834,048 B1 | 12/2004 | Cho et al. | |
| 6,856,616 B1 | 2/2005 | Schuster et al. | |
| 6,857,072 B1 | 2/2005 | Schuster et al. | |
| 6,870,830 B1 | 3/2005 | Schuster et al. | |
| 6,876,632 B1* | 4/2005 | Takeda | 370/259 |
| 6,879,673 B2 | 4/2005 | Creamer et al. | |
| 6,954,521 B2 | 10/2005 | Bull et al. | |
| 6,954,524 B2 | 10/2005 | Gibson | |
| 6,961,332 B1 | 11/2005 | Li et al. | |
| 6,963,633 B1 | 11/2005 | Diede et al. | |
| 6,965,614 B1 | 11/2005 | Osterhout et al. | |
| 6,985,961 B1 | 1/2006 | Ramsayer et al. | |
| 6,996,605 B2 | 2/2006 | Low et al. | |
| 7,020,130 B2 | 3/2006 | Krause et al. | |
| 7,031,700 B1* | 4/2006 | Weaver et al. | 455/420 |
| 7,039,710 B2 | 5/2006 | Khartabil | |
| 7,050,559 B2 | 5/2006 | Silver et al. | |
| 7,082,193 B2* | 7/2006 | Barclay et al. | 379/215.01 |
| 7,085,253 B2 | 8/2006 | Yang | |
| 7,130,282 B2 | 10/2006 | Black | |
| 7,145,997 B2 | 12/2006 | Poikselka et al. | |
| 7,203,293 B1 | 4/2007 | Bedingfield | |
| 7,224,792 B2 | 5/2007 | Fusco | |
| 7,257,837 B2 | 8/2007 | Xu et al. | |
| 7,260,201 B2 | 8/2007 | Jorasch et al. | |
| 7,274,662 B1 | 9/2007 | Kalmane et al. | |
| 7,283,517 B2 | 10/2007 | Yan et al. | |
| 7,290,288 B2 | 10/2007 | Gregg et al. | |
| 7,295,577 B2 | 11/2007 | Moody et al. | |
| 7,301,913 B2 | 11/2007 | Corrao et al. | |
| 7,406,696 B2 | 7/2008 | Burger et al. | |
| 7,426,265 B2 | 9/2008 | Chen et al. | |
| 7,440,440 B1 | 10/2008 | Abichandani et al. | |
| 7,460,657 B1 | 12/2008 | Baeza | |
| 7,489,771 B2 | 2/2009 | McMurry et al. | |
| 7,580,497 B2 | 8/2009 | Wang et al. | |
| 7,593,389 B2 | 9/2009 | Vance | |
| 7,599,355 B2 | 10/2009 | Sunstrum | |
| 7,609,700 B1 | 10/2009 | Ying et al. | |
| 7,609,706 B2 | 10/2009 | Scott et al. | |
| 7,630,481 B2 | 12/2009 | Kafka | |
| 7,715,413 B2 | 5/2010 | Vaziri et al. | |
| 7,743,141 B2 | 6/2010 | Wang et al. | |
| 7,773,581 B2 | 8/2010 | Punj et al. | |
| 7,860,089 B2 | 12/2010 | Tripathi et al. | |
| 8,059,805 B2 | 11/2011 | Claudatos et al. | |
| 8,116,302 B1 | 2/2012 | Robbins | |
| 2002/0038388 A1 | 3/2002 | Netter | |
| 2002/0114318 A1 | 8/2002 | Rines | |
| 2002/0131447 A1 | 9/2002 | Krishnamurthy et al. | |
| 2002/0136359 A1 | 9/2002 | Stumer et al. | |
| 2002/0136363 A1 | 9/2002 | Stumer et al. | |
| 2002/0137495 A1 | 9/2002 | Gabrysch | |
| 2002/0141548 A1 | 10/2002 | Boda | |
| 2002/0156900 A1 | 10/2002 | Marquette et al. | |
| 2003/0028806 A1 | 2/2003 | Govindarajan et al. | |
| 2003/0043992 A1 | 3/2003 | Wengrovitz | |
| 2003/0088421 A1 | 5/2003 | Maes et al. | |
| 2003/0231759 A1 | 12/2003 | Bedingfield, Sr. et al. | |
| 2004/0030750 A1 | 2/2004 | Moore et al. | |
| 2004/0037403 A1 | 2/2004 | Koch | |
| 2004/0051900 A1 | 3/2004 | Sagiya et al. | |
| 2004/0082324 A1 | 4/2004 | Ayoub | |
| 2004/0090954 A1 | 5/2004 | Zhang et al. | |
| 2004/0148395 A1 | 7/2004 | Schulzrinne | |
| 2004/0207724 A1 | 10/2004 | Crouch et al. | |
| 2004/0240656 A1 | 12/2004 | Poustchi | |
| 2004/0243680 A1 | 12/2004 | Mayer | |
| 2004/0249951 A1 | 12/2004 | Grabelsky et al. | |
| 2004/0264406 A1 | 12/2004 | Pattenden et al. | |
| 2005/0013421 A1 | 1/2005 | Chavez et al. | |
| 2005/0043014 A1 | 2/2005 | Hodge | |
| 2005/0069104 A1 | 3/2005 | Hanson et al. | |
| 2005/0078642 A1 | 4/2005 | Mayer et al. | |
| 2005/0123104 A1 | 6/2005 | Bishop et al. | |
| 2005/0129219 A1 | 6/2005 | Williamson | |
| 2005/0147227 A1 | 7/2005 | Chervirala et al. | |
| 2005/0190721 A1 | 9/2005 | Pershan | |
| 2005/0193338 A1 | 9/2005 | Hawkins et al. | |
| 2005/0195802 A1 | 9/2005 | Klein et al. | |
| 2005/0201530 A1 | 9/2005 | Koch et al. | |
| 2005/0213716 A1 | 9/2005 | Zhu et al. | |
| 2005/0215243 A1 | 9/2005 | Black et al. | |
| 2005/0226217 A1* | 10/2005 | Logemann et al. | 370/352 |
| 2005/0237978 A1 | 10/2005 | Segal | |
| 2005/0249196 A1 | 11/2005 | Ansari et al. | |
| 2005/0286466 A1 | 12/2005 | Tagg et al. | |
| 2006/0033809 A1 | 2/2006 | Farley | |
| 2006/0039389 A1 | 2/2006 | Burger et al. | |
| 2006/0062210 A1* | 3/2006 | Dharanikota | 370/356 |
| 2006/0062251 A1 | 3/2006 | Lim et al. | |
| 2006/0067300 A1 | 3/2006 | Poustchi et al. | |
| 2006/0067504 A1 | 3/2006 | Goldman et al. | |
| 2006/0140379 A1* | 6/2006 | Yamamoto et al. | 379/215.01 |
| 2006/0140380 A1* | 6/2006 | Croak et al. | 379/215.01 |
| 2006/0146737 A1 | 7/2006 | Sandgren et al. | |
| 2006/0165060 A1 | 7/2006 | Dua | |
| 2006/0177030 A1 | 8/2006 | Rajagopalan et al. | |
| 2006/0177044 A1 | 8/2006 | O'Neil et al. | |
| 2006/0178130 A1 | 8/2006 | Makrygiannis | |
| 2006/0203986 A1 | 9/2006 | Gibson | |
| 2006/0218283 A1 | 9/2006 | Jones | |
| 2006/0221176 A1 | 10/2006 | Di Pietro et al. | |
| 2006/0251229 A1 | 11/2006 | Gorti et al. | |
| 2006/0285533 A1 | 12/2006 | Divine et al. | |
| 2006/0286984 A1 | 12/2006 | Bonner | |
| 2007/0025270 A1 | 2/2007 | Sylvain | |
| 2007/0058613 A1 | 3/2007 | Beckemeyer | |
| 2007/0083658 A1 | 4/2007 | Hanna et al. | |
| 2007/0092073 A1 | 4/2007 | Olshansky et al. | |
| 2007/0111723 A1 | 5/2007 | Ahmed et al. | |
| 2007/0143858 A1 | 6/2007 | Hearty | |
| 2007/0280469 A1 | 12/2007 | Baker et al. | |
| 2008/0049724 A1 | 2/2008 | Tsujino et al. | |
| 2008/0126549 A1 | 5/2008 | Khanchandani et al. | |

OTHER PUBLICATIONS www.cisco.com/en/U/s/products/sw/voicesw/ps556/products_administration_guide, pp. 3-5 of 26, Sep. 2006.

Rosenberg et al. "RFC 3261, SIP: Session Initiation Protocol", Jun. 2002.

Newton's Telecom Dictionary 22nd Edition, p. 829, Feb. 2006.

Sparks, "RFC 3515, The Session Initiation Protocol (SIP) Refer Method," Apr. 2003.

Biggs et al., "RFC 3891, The Session Initiation Protocol (SIP) 'Replaces' Header," Feb. 2004.

Mahy et al., "RFC 3911, The Session Initiation Protocol (SIP) 'Join' Header," Feb. 2004.

"GR-1298-CORE-AINGR: Switching Systems," Telcordia Technologies, Issue 6, Nov. 2000.

Mahy et al., "draft-ietf-sip-replaces-05—The Session Initiation Protocol (SIP) "Replaces" Header," The Internet Society, Feb. 16, 2004.

Rosenberg et al., "draft-ietf-sipping-dialog-package-04—An INVITE Initiated Dialog Event Package for the Session Initiation Protocol (SIP)," The Internet Society, Feb. 13, 2004.

Lingle et al., "draft-ietf-sip-mib-08—Management Information Base for Session Initiation Protocol (SIP)," The Internet Society, Jul. 16, 2004.

Johnston et al., "draft-ietf-sipping-cc-conferencing-04—Session Initiation Protocol Call Control—Conferencing for User Agents," The Internet Society, Jul. 18, 2004.

Sparks et al., "draft-ietf-sipping-cc-transfer-02—Session Initiation Protocol Call Control—Transfer," The Internet Society, Feb. 15, 2004.

Rosenberg et al., "draft-ietf-sipping-conference-package-04—A Session Initiation Protocol (SIP) Event Package for Conference State," The Internet Society, May 21, 2004.

Petrie, "draft-ietf-sipping-config-framework-04—A Framework for Session Initiation Protocol User Agent Profile Delivery," The Internet Society, Sep. 2006.

"SR-3065: LSSGR Guide," Telcordia Technologies, Issue 7, Aug. 2003.

"SR-504: SPCS Capabilities and Features," Telcordia Technologies, Issue 1, Mar. 1996.

Mahy, "RFC 3842—A Message Summary and Message Waiting Indication Event Package for the Session Initiation Protocol (SIP)," The Internet Society, Aug. 2004.

Rosenberg et al., "RFC 3840—Indicating User Agent Capabilities in the Session Initiation Protocol (SIP)," The Internet Society, Aug. 2004.

Harrington et al., "RFC 3411—An Architecture for Describing Simple Network Management Protocol (SNMP) Management Frameworks," The Internet Society, Dec. 2002.

Jennings et al., "RFC 3325—Private Extensions to the Session Initiation Protocol (SIP) for Asserted Identity within Trusted Networks," The Internet Society, Nov. 2002.

Schulzrinne, "draft-ietf-sipping-sos-00—Emergency Services URI for the Session Initiation Protocol," The Internet Society, Feb. 8, 2004.

Rosenberg et al., "RFC 3262—Reliability of Provisional Responses in the Session Initiation Protocol (SIP)," The Internet Society, Jun. 2002.

Rosenberg, "RFC 3311—The Session Initiation Protocol (SIP) UPDATE Method,"The Internet Society, Sep. 2002.

Mahy et al., "draft-ietf-sipping-cc-framework-03—A Call Control and Multi-party usage framework for the Session Initiation Protocol (SIP)," The Internet Society, Oct. 27, 2003.

Mahy et al., "draft-ietf-sip-join-03—The Session Initiation Protocol (SIP) "Join" Header," The Internet Society, Feb. 2004.

Schulzrinne et al., "RFC 2833—RTP Payload for DTMF Digits, Telephony Tones and Telephony Signals," The Internet Society, May 2000.

Schulzrinne et al., "RFC 1889—RTP: A Transport Protocol for Real-Time Applications," The Internet Society, Jan. 1996.

Handley et al., "RFC 2327—SDP: Session Description Protocol," The Internet Society, Apr. 1998.

\* cited by examiner

METHOD AND SYSTEM FOR PROVIDING CALL WAITING FEATURES IN A SIP-BASED NETWORK

CROSS-REFERENCE TO RELATED APPLICATIONS

This patent application claims priority to U.S. Provisional Patent Application No. 60/719,465, filed Sep. 22, 2005, which is hereby incorporated by reference herein in its entirety.

BACKGROUND INFORMATION

Session Initiation Protocol (SIP) is a call control signaling protocol for Internet Protocol (IP) networks. SIP is designed to be device-agnostic—that is, it is intended to provide a highly flexible call signaling capability that is not tailored to the capabilities of any particular device. Analog telephone signaling, on the other hand, is device-specific and highly constrained because of the historical legacy of the services delivered to the device. As a result, many call features available in traditional analog telephone devices are not easily integrated in a SIP-based network.

BRIEF DESCRIPTION OF THE DRAWINGS

In order to facilitate a fuller understanding of the exemplary embodiments of the present inventions, reference is now made to the appended drawings. These drawings should not be construed as limiting, but are intended to be exemplary only.

DETAILED DESCRIPTION OF PREFERRED EMBODIMENTS

A system and process of an exemplary embodiment of the present invention provides call waiting features over a SIP based network to a device such as an analog based device. An embodiment of the present invention may support a call waiting "deluxe" service which allows a called party to respond to an incoming call request by providing one or more user actions. User actions by way of non-limiting example may include answering a call request, forwarding a call request, transferring a call request to an announcement server, dropping a call request, putting a call request on hold, transferring a call request to a voice mail server, putting a call request in conference with an existing call and/or other user actions.

Figure 1:
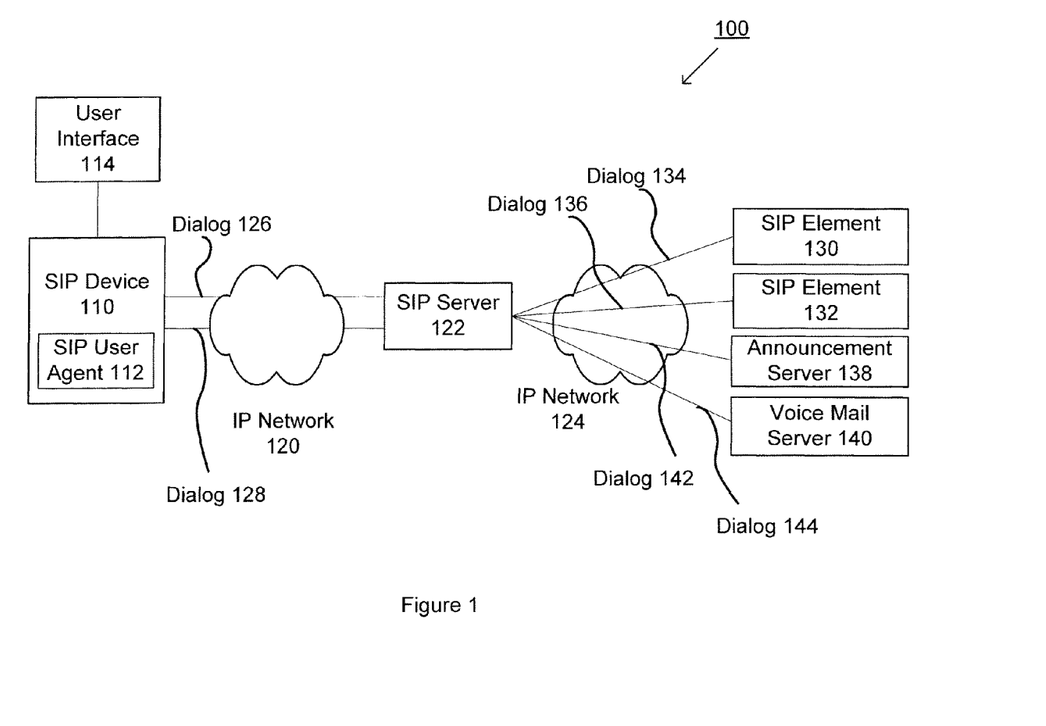
FIG. 1 is an exemplary SIP-based network system, according to an embodiment of the present invention.

FIG. 1 is an exemplary SIP-based network system, according to an embodiment of the present invention. System 100 illustrates an exemplary system for supporting SIP communication, in particular a call waiting "deluxe" service. As illustrated, SIP Device 110 may be coupled to User Interface 114. SIP Device 110 may include a SIP User Agent 112 for communicating across IP Network 120 to a SIP Server 122. SIP Server 122 may provide communication to other SIP devices, as shown by SIP Element 130 and SIP Element 132, through IP Network 124. Announcement Server 138 may allow calls to be directed to announcements. Voice Mail Server 140 may allow calls to be directed to voice mail. Dialogs 126, 128, 134, 136, 142 and 144 may provide connectivity between one or more SIP elements and a server. The various components of system 100 may be further duplicated, combined and/or integrated to support various applications and platforms. Additional elements may also be implemented in the system to support various applications. A SIP-based network may also include an IP network, packet switched based network or other type of network. The elements referred to in the Figures may include other network or packet switched based elements. For example, the elements referred to as "SIP" may include other network devices, elements, components, etc.

SIP Device 110 may represent a device that manages User Interface 114. User Interface 114 may include a traditional telephone and other data communication device using voice-band or other signaling, including but not limited to data modems, facsimile devices, teletype (TTY) equipment, etc. SIP Device 110 may contain SIP User Agent 112. SIP User Agent 112 may be integrated with SIP Device 110 or remote from SIP Device 110. SIP User Agent 112 may perform interworking between SIP signaling and user interface actions. For example, SIP User Agent 112 may manage an exchange of media (e.g., audio, etc.) between User Interface 114 and a Real Time Protocol (RTP) media stream of a media session set up by the SIP signaling. SIP Device 110 may originate calls to and receive calls from other users. SIP Device 110 may communicate through IP Network 120 to SIP Server 122.

SIP Server 122 may represent a SIP proxy or application server that acts on behalf of SIP Device 110. For example, SIP Server 122 may manage a SIP Address of Record (AOR) on behalf of SIP Device 110. SIP Device 110 may register with SIP Server 122 and send SIP signaling through SIP Server 122 to other SIP elements, such as SIP Element 130 and SIP Element 132. For example, a call to the SIP AOR may be delivered to SIP Server 122, which in turn delivers the call to SIP Device 110. SIP Server 122 may perform some service on behalf of SIP Device 110, or may simply forward SIP messages to and from SIP Device 110. SIP Device 110 communicates through IP Network 124 to SIP Element 130 and/or SIP Element 132.

SIP Element 130 and SIP Element 132 may represent users with which the user of SIP Device 110 communicates. A SIP element may be a SIP Device, SIP Server, and/or other SIP enabled device. In addition, a SIP element may also represent a PSTN device that may be reached by a gateway that, directly or indirectly, acts as a SIP User Agent.

As shown in FIG. 1, multiple dialogs may be established between a SIP element and a network element. According to an exemplary application, Dialogs 126, 128, 134, 136, 142 and 144 may provide connectivity between one or more SIP elements and a network element. For example, one dialog may be used to connect a SIP element to a SIP server and maintain an active call between a SIP server acting as a back to back user agent (B2BUA) and a second SIP element across an IP network or other network. SIP elements may be connected to user interfaces providing audio connectivity between two or more users thereby permitting a call. According to one embodiment of the present invention, a server may provide connectivity between two or more users by managing these dialogs, which may be in response to a user selection. For example, if a user selects "answer," a SIP server may connect two dialogs by interconnecting the two media streams of the dialogs and permitting the transmission of audio between two or more users. By way of non-limiting example, a first user at user interface 114 may engage in an active call with a second user connected to SIP element 130. This conversation may be established by SIP server 122 interconnecting the media streams of dialog 126 with dialog 134.

A user connected to SIP Element 132 may call the first user by sending a SIP INVITE request to SIP Server 122. SIP Server 122 may send the INVITE request to SIP Device 110. According to one embodiment, Dialog 128 may be established. SIP Device 110 may indicate to the user at User Interface 114 that it has received an INVITE request. The user at User Interface 114 may perform an action to answer the INVITE request. This action may place existing Dialog 126 on hold and activate Dialog 128, enabling the user to send a dual tone multi frequency (DTMF) signal to SIP Server 122 on Dialog 128. By way of non-limiting example, the user action may be a "hookswitch flash." SIP Server 122 may wait to receive a user response to the SIP INVITE request. For example, SIP Server 122 may set a timer which may execute a specified default action upon expiration. A user response may be a DTMF signal which may correspond to a user selection. By way of non-limiting example, a user response transmitted by SIP Device 110 may include a DTMF signal corresponding to a user response of "answer" or other action. As a result, SIP Server 122 may allow User Interface 114 to answer a call request from SIP Element 132 when currently engaged in an active call with SIP Element 130. SIP Server 122 may then interconnect the media streams of Dialog 128 and Dialog 134 permitting the exchange of audio or other data between the first user and the third user.

In other examples, SIP Server 122 may manage the dialogs between a first user and one or more other users in response to an expiration of a timer set by SIP Server 122 or other element. For example, the timer may be set after sending a call request to a first user. For example, the timer may be set after SIP Server 122 detects that Dialog 126 or Dialog 128 has been activated (taken "off hold") by SIP Device 110. In some examples, the timer may be a pre-determined response time or may be based on a condition. According to an embodiment of the present invention, a server may manage dialogs between a first user and one or more other users upon expiration of a timer by executing a default action. By way of non-limiting example, actions available to a user for the management of call dialogs may include one or more of the following: answer, forward, announcement, drop, hold, conference and/or other action. For example, one or more user responses may be available to a first user when the first user is engaged in an active call and a second call request is received by the first user. By way of non-limiting example, additional actions available to a user for the management of call dialogs may also include return, drop, conference and/or other action.

These user responses may be available to a first user when a user is engaged in one active call and has a second answered call on hold. By way of non-limiting example, further actions available to a user for the management of call dialogs may include "drop first choice," "drop last choice," etc. These choices may be available, for example, when a first user is engaged in a conference call with two or more additional users.

In some exemplary embodiments of the present invention, User Interface 114 may be an Analog Display Services Interface (ADSI) compatible telephone, which may provide a display and may provide additional function buttons. The additional function buttons may be mapped to correspond to user actions which may send hookswitch flashes, a DTMF signal and/or other action. In some embodiments, a user action may be indicated by a hookswitch flash alone. In other examples, the embodiment of the present invention may be combined with other functionality such as caller identification and/or talking call waiting which may provide an indication of the identity of a caller. In such examples, a user may use the calling party's identity to determine the disposition of an incoming call request.

Announcement Server 138 may allow calls to be directed to announcements. For example, an announcement server may provide recorded announcements. In addition, Announcement Server 138 may be connected to SIP Server 122 over an IP network. Announcement Server 138 may play a specified announcement to a call directed to the announcement server. In an exemplary embodiment of the present invention, Announcement Server may provide a customized announcement based on the identity of the intended call recipient or other attribute. For example, an announcement may be customized to contain an intended call recipient's name. In other embodiments, an announcement may be synthesized based on a call information such as the identification or geographic origin of the call.

Voice Mail Server 140 may allow calls to be directed to voice mail. Voice Mail Server 140 may be accessible to SIP Server 122 over an IP network. For example, a call request may be redirected from SIP Device 110 to Voice Mail Server 140 by SIP Server 122. SIP Server 122 may redirect the call request in response to a user specified action, in response to the expiration of a timer or other response. Voice Mail Server 140 may provide voice mail functionality to one or more users.

According to some embodiments of the present invention, various combinations of a SIP server, an announcement server and a voice mail server may be implemented.

Figure 2:
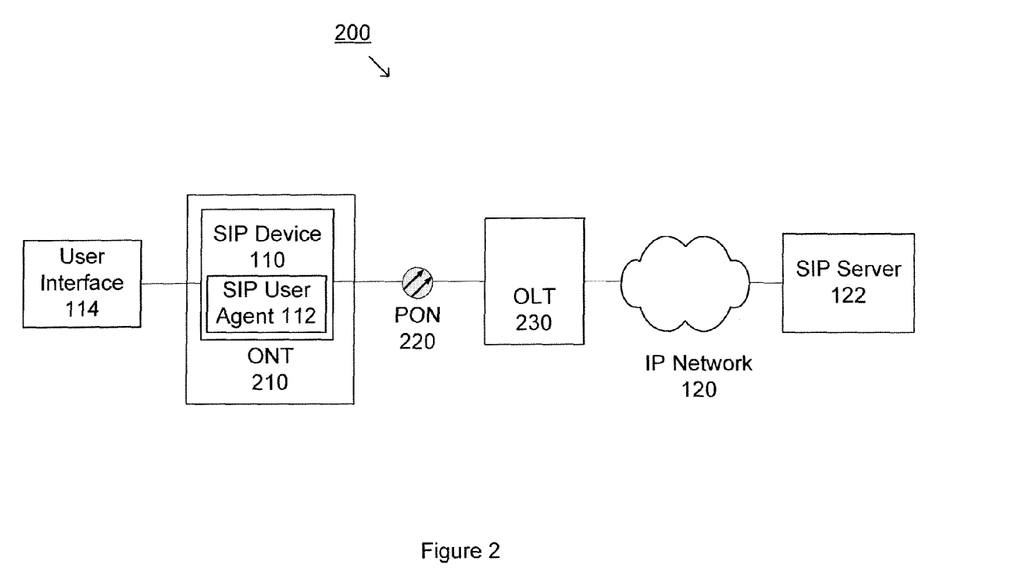
FIG. 2 illustrates an exemplary implementation where a SIP Device is embedded in a FTTP network, according to an embodiment of the present invention.
Figure 3:
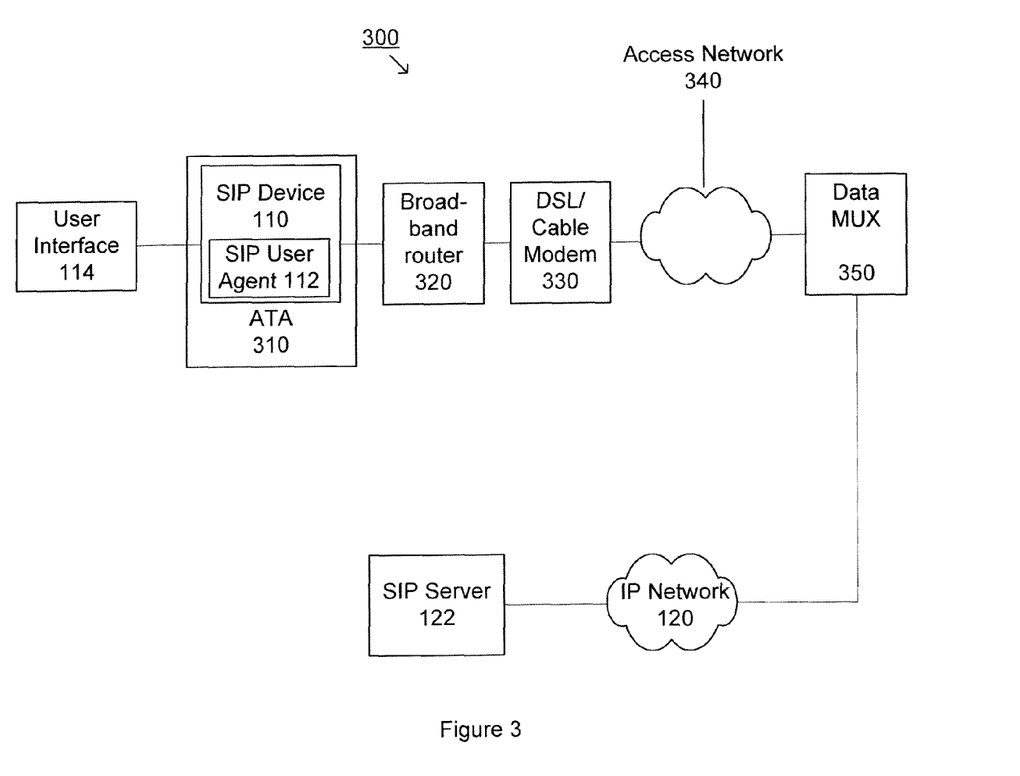
FIG. 3 illustrates an exemplary implementation where a SIP Device is embedded in an ATA device attached to a network, according to an embodiment of the present invention.

FIGS. 2 and 3 show exemplary implementations of a SIP Device. FIG. 2 illustrates an exemplary implementation where a SIP Device is used in connection with a Fiber-to-the-Premises (FTTP) network, according to an embodiment of the present invention. FIG. 3 illustrates an exemplary implementation where a SIP Device is embedded in an Analog Telephone Adapter (ATA) which is used in connection with a traditional (e.g., electrical) IP-enabled access network, according to an embodiment of the present invention. Other implementations with other devices and/or networks may also be realized.

As shown in FIG. 2, User Interface 114 may be connected to SIP Device 110. SIP Device 110 may be embedded in Optical Network Terminal (ONT) 210 or otherwise integrated. ONT 210 may be connected to an Optical Line Terminal (OLT) 230 via a Passive Optical Network (PON) 220 acting as an access network for communications between ONTs 210 and OLTs 230. According to an exemplary application, OLT 230 may be located at a Central Office. ONT 210 may be connected over PON 220 to the OLT 230, which in turn passes that connection through transport IP network 120 to SIP Server 122. According to an exemplary application, OLT 230 may maintain an IP connection between SIP Device 110 on the ONT 210 and the transport IP network 120. In this exemplary application, the OLT 230 may not process SIP signaling, but rather allows SIP signaling to pass through to its destination.

FIG. 3 illustrates SIP Device 110 embedded in an Analog Telephone Adapter (ATA) 310 in a home or other location that subscribes to a broadband service delivered via an access network, such as DSL or cable modem service. The ATA device may be attached to a network, such as a broadband data network, IP network and/or other network. User Interface 114 may be connected to SIP Device 110. ATA 310 may be connected to Broadband Router 320, which in turn may be connected to a DSL or cable modem 330, which in turn may be connected to access network 340. Access network 340 may provide connectivity to transport IP network 120 through which the SIP Device 110 may communicate with SIP Server 122. In one example, as shown in FIG. 3, data multiplexer (MUX) 350 may provide a point of connection for transmissions between access network 340 and the transport IP network 120.

The various components of systems 200 and 300 as shown in FIGS. 2 and 3 may be further duplicated, combined and/or integrated to support various applications and platforms. Additional elements may also be implemented in the systems described above to support various applications. By way of non-limiting example a user of User Interface 114 who is currently engaged in an active call with a user of SIP Element 130, may receive a second call request from a user of SIP Element 132. The user of User Interface 114 may select a user action signifying forwarding the second call request to Voice Mail Server 140.

Figure 4:
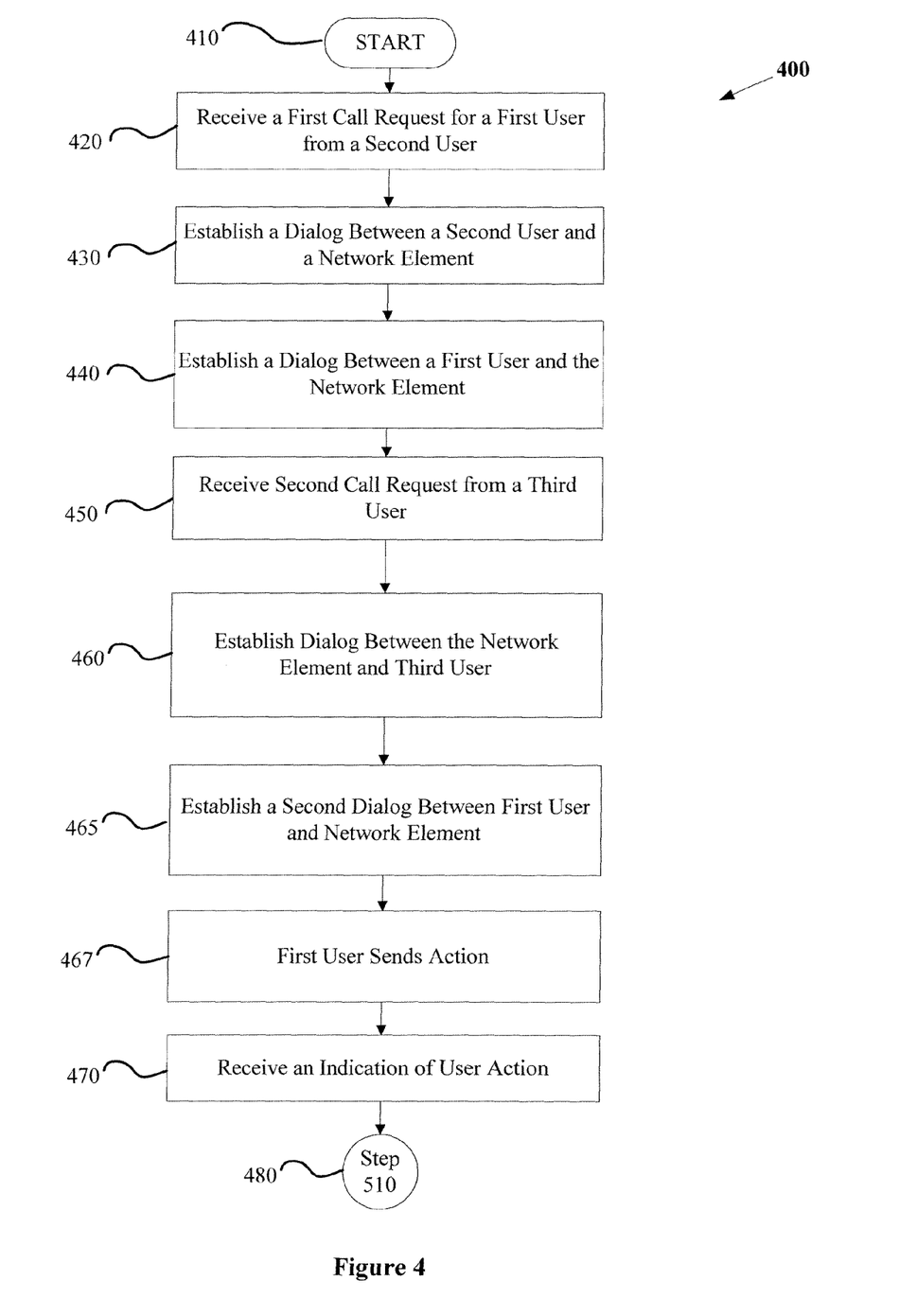
FIG. 4 is a flowchart depicting a method of providing user actions in response to a call request, according to an embodiment of the present invention.

FIG. 4 is a flowchart depicting a method for providing user actions in response to a call request, according to an embodiment of the present invention. According to one or more embodiments, flow chart 400 may begin at step 410.

At step 420, a first call request for a first user may be received from a second user. According to some examples, a call request may be received at a network element. In one or more embodiments, a call request may be received at SIP Server 122 associated with the first user, and may be in the form of a SIP INVITE message from SIP Element 130 associated with the second user.

At step 430, a dialog may be established between a second user and a network element. By way of non-limiting example, Dialog 134 may be established between SIP Element 130 and SIP Server 122.

At step 440, a dialog may be established between the first user and a network element. By way of non-limiting example, Dialog 126 may be established between SIP Device 110 associated with the first user and SIP Server 122. According to an embodiment of the present invention, dialogs may be interconnected permitting the transmission of audio signals. In one or more embodiments, a SIP server may permit conversation, the transmission of audio signals and/or other data between a caller and a call recipient by interconnecting the dialog of a call recipient and a SIP server with the dialog of a caller and a SIP server. In such embodiments a SIP server may act as a back to back user agent (B2BUA).

At step 450, a second call request to the first user may be received from a third user. According to some examples, a network element may receive a second call request. In one or more embodiments, a call request may be a SIP INVITE from SIP Element 132 associated with the third user which may be received at SIP Server 122.

At step 460, a dialog may be established between a network element and the third user. By way of non-limiting example, Dialog 136 may be established between SW Server 122 and SIP Element 132.

At step 465, a second dialog may be established between the first user and a network element. By way of non-limited example, Dialog 128 may be established between SIP Device 110 and SIP Server 122. The first user may be alerted to the establishment of the second dialog, for example, by SIP Device 110 providing a device-compatible alert signal to User Interface 114. For example, SIP Device 110 may provide an alert tone or other alert message to User Interface 114.

At step 467, the first user may take an action in response to the second dialog. For example, the first user may take an action that causes the first dialog between the first user and a network element to be placed on hold and the second dialog between the first user and a network element to become active. For example, the user at SIP Device 110 may place the existing Dialog 126 on hold and activate the new Dialog 128. Alternatively, the first user may take no action in response to the second dialog. A network element may wait to receive a user action on the second dialog, for example, by establishing a timer, and may interpret a timeout with no indication of user action being received as a default user action. In the described embodiment, SIP Server 122 may establish a timer for a response from SIP Device 110, and interpret a failure to receive an action indication as a selection of the default action by the first user.

In embodiments where an analog user interface (e.g., analog telephone) is being used in conjunction with SIP Device 110, user action may take a form consistent with the capabilities of such user interfaces. For example, the user may perform a "hookswitch flash" to signal a hold of the active call and a switch to the new call. Likewise, the user may depress keypad keys of User Interface 114 to generate DTMF tones indicating selection of actions. Such actions may be interpreted by SIP Device 110 and SIP User Agent 112 as selection of a call waiting deluxe call disposition option. SIP User Agent 112 may then formulate a SIP message that includes an indication of the action selection by the first user. For example, SIP User Agent 112 may generate a message that includes indications of the DTMF tones generated by User Interface 114 immediately after receiving the hookswitch flash, and send such message to SIP Server 112 as part of Dialog 128.

At step 470, an indication of a user action may be received. For example, an indication of a user action may be received at a network element in response to the second call request. According to an embodiment of the present invention, the indication of a user action may indicate a disposition option of the second call request, according to the disposition options that may be available as part of the call waiting deluxe service. In some embodiments, the indication of the user action may include indications of one or more DTMF tones generated by the user interface while the second dialog is active.

Figure 5:
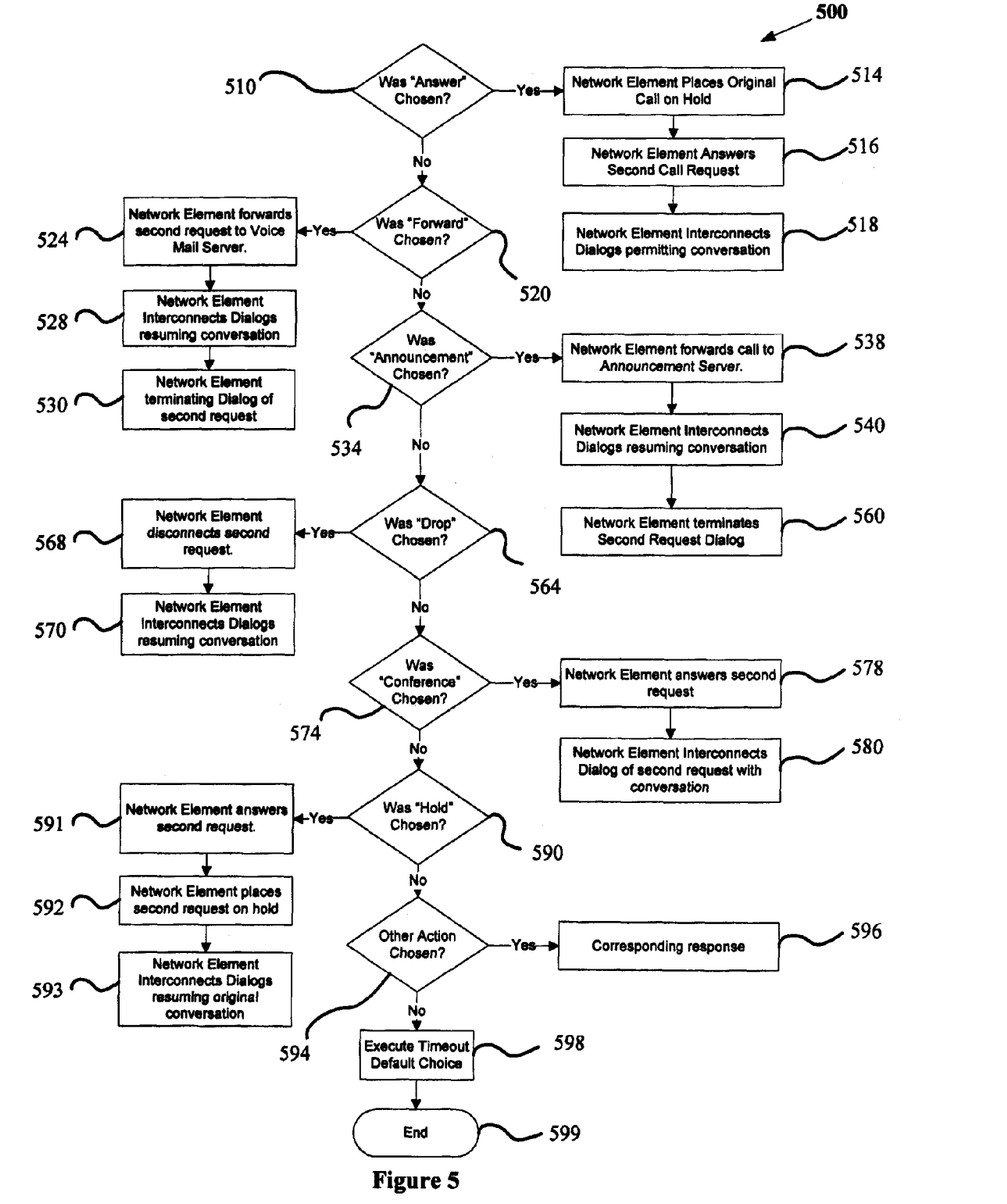
FIG. 5 is a flowchart depicting a method of providing user actions for disposition of a second call when currently engaged in an active call, according to an embodiment of the present invention.

At step 480, the process may continue at step 510 of FIG. 5.

FIG. 5 is a flowchart depicting a method of providing user actions for disposition of a second call to a first user from a third user when a first user is currently engaged in an active call with a second user, according to an embodiment of the present invention. As shown, several options are available to the first user which may include "Answer", "Forward", "Announcement", "Drop", "Hold" and/or other action.

In some embodiments a response from the first user may be received at a network element. For example, a SIP server may receive a user response of an indication of a DTMF signal from a SIP device, which the network element may map to certain available options for call disposition. At decision box 510, if a user response signifying "Answer" is received, the flow may proceed to step 514. If a user response signifying "Answer" is not received, the flow may proceed to step 520. At step 514, a network element may place the original dialog with the second user on hold. At step 516, a network element may affirmatively answer the second call request. At step 518, a network element may interconnect the dialogs of a call recipient and a third party permitting the transmission of audio signals between the two parties. By way of non-limiting example of the illustrated embodiment, SIP Server 122 may place Dialog 134 on hold and may interconnect Dialogs 136 and 128, thus allowing for communication between the first user and third user to occur.

At decision box 520, if a user response signifying "Forward" is received, the flow may proceed to step 524. At step 524, a network element may forward the second call request. For example, a network element may forward the second call request to a voice mail server. In other embodiments, a network element may forward a second call request to a specified destination (possibly preset by the first user). At step 528, if the network element previously disconnected the dialogs of the first user and second user pending disposition of the second call request, the network element may interconnect the dialogs of the first user and the network element and the second user and the network element which may resume their communications. At step 530, the network element may terminate the dialog between the first user and the network element established as part of the second call request. In the illustrated embodiment, a receipt of an indication from SIP Device 110 that maps to the "Forward" action may cause SIP Server 122 to forward the call from the third user to Voice Mail Server 140, and terminate the Dialog 136.

If a user response signifying "Forward" is not received, the flow may proceed to decision box 534. At decision box 534, if a user response signifying "Announcement" is received, the flow may proceed to step 538. At step 538, a network element may forward the second call to an announcement server. According to some examples, a caller forwarded to an announcement server may hear a recorded announcement. According to other examples, a caller forwarded to an announcement server may hear a personalized announcement. At step 540, if the network element previously disconnected the dialogs of the first user and second user pending disposition of the second call request, the network element may interconnect the dialogs of the first user and the network element and the second user and the network element, which may resume their communications. At step 560, the network element may terminate the dialog between the first user and the network element established as part of the second call request. In the illustrated embodiment, a receipt of an indication from SIP Device 110 that maps to the "Announcement" action may cause SIP Server 122 to forward the call from the third user to Announcement Server 138, and terminate the Dialog 128.

If a user response signifying "Announcement" is not received, the flow may proceed to decision box 564. At decision box 564, if a user response signifying "Drop" is received, the flow may proceed to step 568. At step 568, a network element may terminate the dialog between the first user and the network element established as part of the second call request, and terminate the dialog between the third user and the network element also established as part of the second call request. According to some examples, at step 570 the network element may maintain (or reconnect, if they were disconnected) the dialogs permitting communication between the first user and the second user. In the illustrated embodiment, a receipt of an indication from SIP Device 110 that maps to the "Drop" action may cause SIP Server 122 to terminate Dialog 136 and Dialog 128.

If a user response signifying "Drop" is not received, the flow may proceed to decision box 574. At decision box 574, if a user response signifying "Conference" is received, the flow may proceed to step 578. At step 578, a network element may affirmatively answer the second call request. At step 580, a network element may interconnect the dialogs of the original communications between the first user and second user with the dialog established with the third user as part of the second call request, thus permitting the transmission of communications between the first user and the second and third users. In the illustrated embodiment, a receipt of an indication from SIP Device 110 that maps to the "Conference" action may cause SIP Server 122 to interconnect Dialog 136 with Dialog 126 and Dialog 134.

If a user response signifying "Conference" is not received, the flow may proceed to decision box 590. At decision box 590, if a user response signifying "Hold" is received, the flow may proceed to step 591. At step 591, a network element may affirmatively answer the second call request. At step 592, a network element may place the dialog between a third user and a network element established as part of the second call request on hold. At step 593, if the network element previously disconnected the dialogs of the first user and second user pending disposition of the second call request, the network element may interconnect the dialogs of the first user and the network element and the second user and the network element, which may resume their communication.

If a user response signifying "Hold" is not received, the flow may proceed to decision box 594. At decision box 594, if a user response signifying another action is received, the flow may proceed to step 596. At step 596, a network element may perform an action corresponding to the signal specified by a user response (or if no further actions are supported, may indicate an error condition).

If a user response signifying another action is not received, the flow may proceed to step 598. At step 598, if no user response is received, a timer set by a network element may expire and the network element may execute a default action. For example, the default action may be preset to forward the incoming call to a voice mail server.

At step 599, the process may end.

Figure 6:
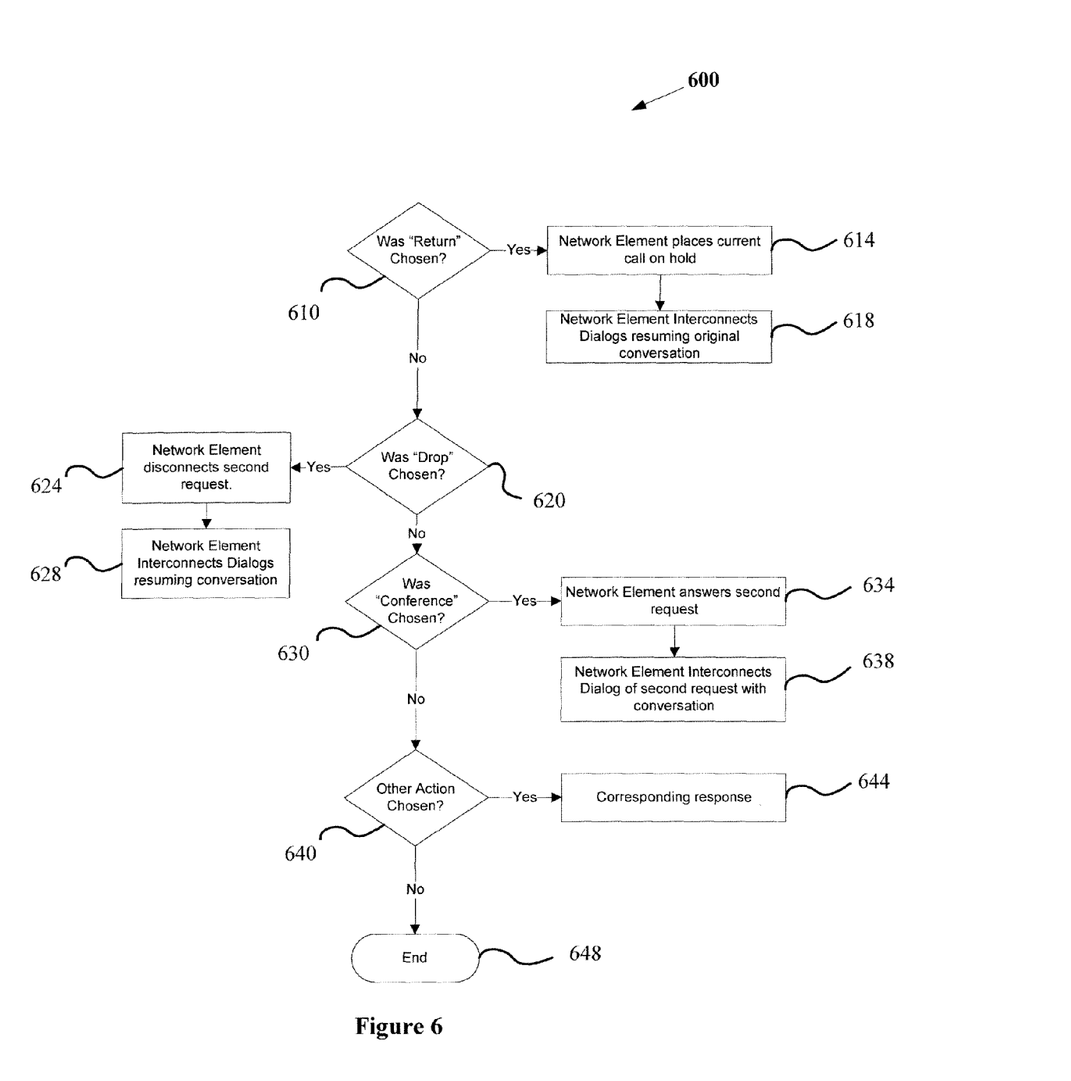
FIG. 6 is a flowchart depicting a method of providing user actions for managing two or more connected calls, according to an embodiment of the present invention.

FIG. 6 is a flowchart depicting a method of providing user actions for managing two or more connected calls, according to an embodiment of the present invention. For example, the options of FIG. 6 may be applied in an exemplary scenario where a first call is active and a second call connected to a same network element as the first call is on hold (e.g., as a result of an initial "Hold" action specified by the called party in response to the call request, such as described above). The steps of FIG. 6 may be applied to other scenarios.

At decision box 610, if a user response signifying "Return" is received, the flow may proceed to step 614. If a user response signifying "Return" is not received, the flow may proceed to decision box 620.

At step 614, a network element may place a current call on hold. At step 618, a network element may interconnect dialogs of a first user and the network element and a second user and the network element which may resume a conversation.

At decision box 620, if a user response signifying "Drop" is received, the flow may proceed to step 624. At step 624, a network element may disconnect a dialog of a second request. At step 628, a network element may interconnect dialogs of a first user and the network element and a second user and the network element which may resume a conversation.

If a user response signifying "Drop" is not received, the flow may proceed to decision box 630. At decision box 630, if a user response signifying "Conference" is received, the flow may proceed to step 634. At step 638, a network element may interconnect the dialogs of the original conversation and a second call request permitting the transmission of audio between a first user and two or more other users.

If a user response signifying "Conference" is not received, the flow may proceed to decision box 640. At decision box 640, if a user response signifying another action is received, the flow may proceed to step 644. If a user response signifying another action is not received, the flow may proceed to step 648. At step 644, a network element may perform an action corresponding to a signal specified by a user response.

At step 648, the process may end.

Figure 7:
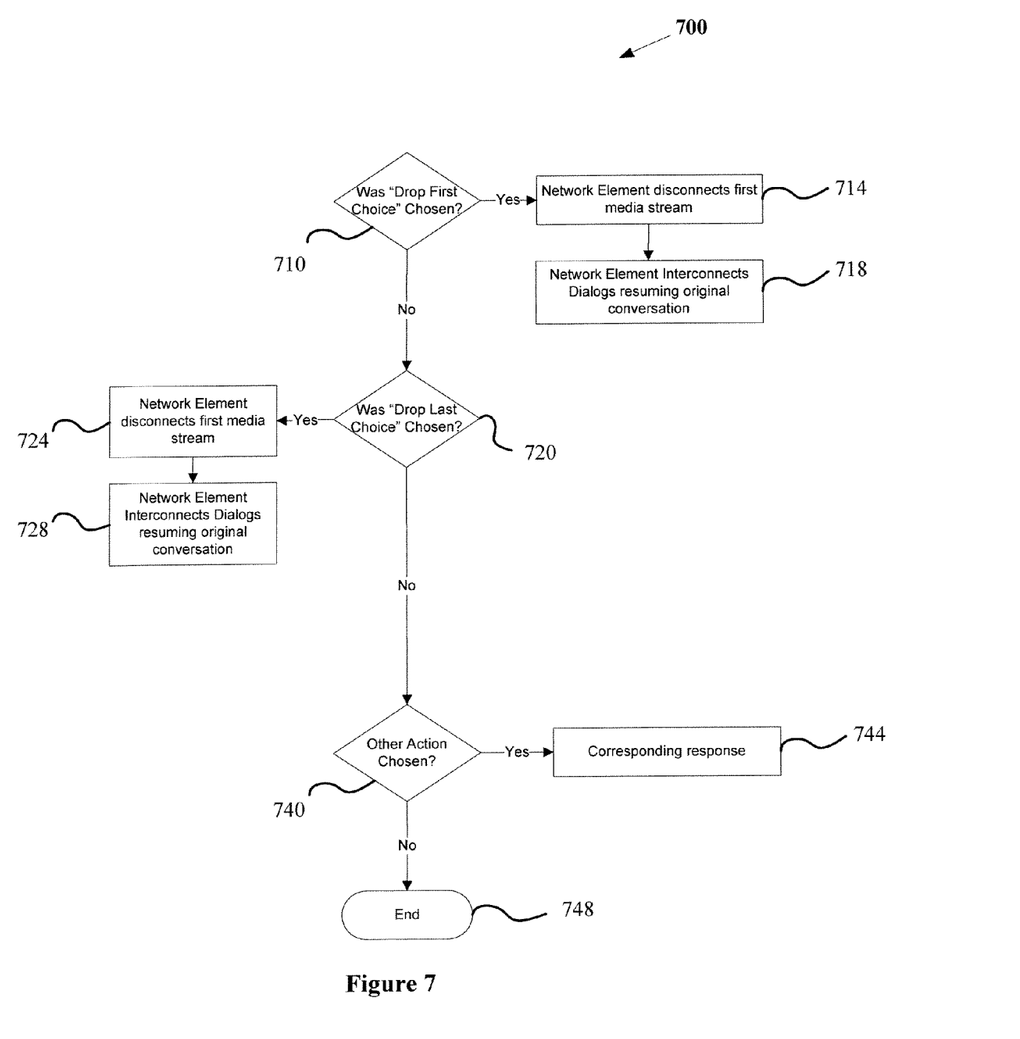
FIG. 7 is a flowchart depicting a method of providing user actions for managing two or more calls in a conference call, according to an embodiment of the present invention.

FIG. 7 is a flowchart depicting a method of providing user actions for managing two or more calls in a conference call, according to an embodiment of the present invention. The options of FIG. 7 may be applied during a conference call involving multiple users (e.g., as a result of a user specifying the "Conference" action in response to an initial call request, as described above).

At decision box 710, if a user response signifying "Drop First Choice" is received, the flow may proceed to step 714. At step 714, a network element may remove a dialog between a second user and a network element from a conference and may terminate that dialog. At step 718, a network element may interconnect dialogs of a first user and the network element and a third user and the network element which may resume a conversation.

If a user response signifying "Drop First Choice" is not received, the flow may proceed to decision box 720.

At decision box 720, if a user response signifying "Drop Last Choice" is received, the flow may proceed to step 724. At step 724, a network element may remove a dialog between a third user and a network element from a conference and may terminate that dialog. At step 728, a network element may interconnect dialogs of a first user and the network element and a second user and the network element which may resume a conversation. If a user response signifying "Drop Last Choice" is not received, the flow may proceed to decision box 740. At decision box 740, if a user response signifying another action is received, the flow may proceed to step 744. At step 744, a network element may perform an action corresponding to a signal specified by a user response.

If a user response signifying another action is not received, the flow may proceed to step 748.

At step 748, the process may end.

Figure 8:
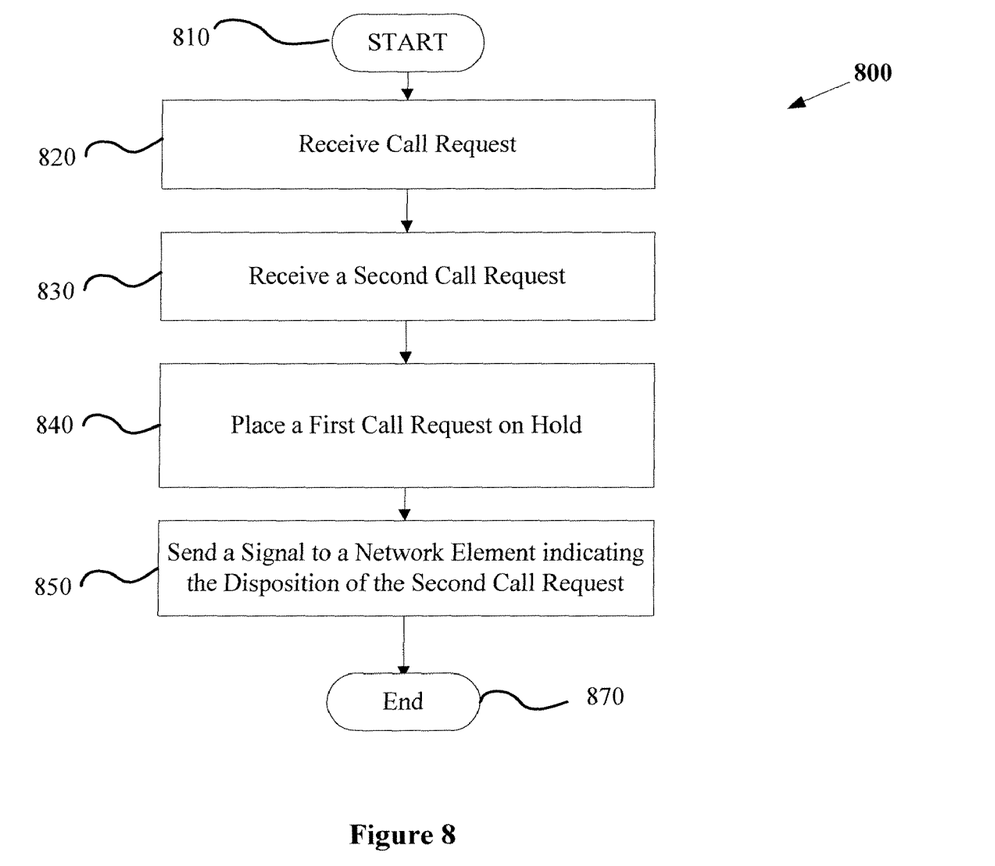
FIG. 8 is a flowchart depicting a method of managing one or more call requests received at a device, according to an embodiment of the present invention.

FIG. 8 is a flowchart depicting a method of managing one or more call requests received at a device, according to an embodiment of the present invention. According to some embodiments, the process may start at step 810.

At step 820, a call request may be received. According to some examples, a call request may be a SIP INVITE received by a SIP device. According to some embodiments, this may establish a dialog between a network element and a SIP Device. At step 830, a second call request may be received. At step 840, a user action may be performed that places the dialog established by the first call request on hold and answers the second call request, establishing a second dialog between a device and a network element. In some embodiments, the user action may be a hookswitch flash.

At step 850, the user may use the user interface to generate a signal corresponding to a disposition option for the call request, and the SIP device may send a message including an indication of the selection action to a network element indicating the disposition of a call request. In one or more examples, the signal generated by the user interface may be a DTMF signal corresponding to a user selection. Other user signals may be recognized. In some examples, the SIP device receiving such signals may interpret such signals and generate appropriate SIP messaging corresponding to such signals, thus enabling traditional analog devices connected to the SIP device to provide a user with one or more functions to handle incoming call requests. In some embodiments, steps 840 and 850 may be performed multiple times during the existence of the first and second dialogs. For example, upon receipt of the hookswitch flash, the SIP device may put the currently active dialog on hold, and activate the currently held dialog. The SIP device may then send any action selection indications received from the user interface to the network element as part of the newly activated dialog to effect the selected call disposition.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
   receiving a first call request from a first calling party to a first called party;
   establishing a first dialog between a SIP based network element and the first called party;
     establishing a second dialog between the SIP based network element and the first calling party;
     establishing a third dialog between the SIP based network element and a second calling party in response to a second call request from the second calling party;
     establishing a fourth dialog between the SIP based network element and first called party as a result of establishing the third dialog;
     waiting for a response from the first called party in the fourth dialog;
   providing a default action to be executed after a predetermined period of time of user inactivity in response to the second call request; and
     receiving an indication of an action from the first called party to manage the disposition of the second call request,
     wherein the SIP based network element acts as a back to back user agent for one or more SIP devices to enable a call disposition in response to indication of the action received from the first called party including: conference call functionality between three or more users, placing a call on hold, dropping the first calling party, dropping the second calling party, answering a call, and forwarding the second call request to a specified destination.

2. The method of claim 1 wherein the network element comprises a SIP based server associated with an optical network terminal.

3. The method of claim 1 wherein the one or more indications of actions is one or more indications of a dual tone multi frequency (DTMF) signal.

4. The method of claim 1, further comprising:
in response to the one or more indications of actions, placing the first dialog on hold, and connecting the fourth dialog and the third dialog.

5. The method of claim 1, further comprising:
in response to the one or more indications of actions, holding the second dialog.

6. The method of claim 1, further comprising:
in response to the one or more indications of actions, forwarding the second call request to an announcement server and playing an announcement to the second calling party.

7. The method of claim 1, further comprising:
in response to the one or more indications of actions, terminating the third dialog.

8. The method of claim 1, further comprising:
in response to the one or more indications of actions, conferencing the first dialog, the second dialog and the third dialog.

9. The method of claim 1, further comprising:
in response to the one or more indications of actions, placing an active dialog on hold, and resuming a previously held dialog.

10. The method of claim 1, further comprising:
in response to the one or more indications of actions, ending a currently active dialog, and resuming a previously held dialog.

11. The method of claim 1 further comprising:
in response to the one or more indications of actions, ending a first active dialog between a user and a first caller in a conference call, and maintaining a second active dialog between a user and a second caller in response to the user action.

12. A non-transitory device implemented application comprising:
code to perform the acts of the method of claim 1.

13. A system, comprising:
a SIP based network element configured to:
receive a first call request from a first calling party to a first called party;
establish a first dialog between the SIP based network element and the first called party;
establishing a second dialog between the SIP based network element and the first calling party;
establish a third dialog between the SIP based network element and a second calling party in response to a second call request from a second calling party;
establish a fourth dialog between the SIP based network element and the first called party as a result of establishing the third dialog;
wait for a response from the first called party in the fourth dialog;
provide a default action to be executed after a predetermined period of time of user inactivity in response to the second call request; and
receive an indication of an action from the first called party to manage the disposition of the second call request,
wherein the SIP based network element acts as a back to back user agent for one or more SIP devices to enable a call disposition in response to the indication of the action received from the first called party including: conference call functionality between three or more users, placing a call on hold, dropping the first calling party, dropping the second calling party, answering a call, and forwarding the second call request to a specified destination.

14. The system of claim 13 wherein a call request is a SIP INVITE received from one or more SIP devices associated with an optical network terminal.

* * * * *